United States Patent
Kirk (10) Patent No.: US 12,380,659 B1
(45) Date of Patent: Aug. 5, 2025

(54) AUGMENTED REALITY DIGITAL OBJECT IMAGE PLACEMENT AND ANCHORING SYSTEM AND PROCESS

(71) Applicant: Justin Curtis Kirk, Tyler, TX (US)

(72) Inventor: Justin Curtis Kirk, Tyler, TX (US)

( * ) Notice: Subject to any disclaimer, the term of this patent is extended or adjusted under 35 U.S.C. 154(b) by 197 days.

(21) Appl. No.: 18/237,369

(22) Filed: Aug. 23, 2023

Related U.S. Application Data (60) Provisional application No. 63/400,187, filed on Aug. 23, 2022.

(51) Int. Cl.
| | |
|---|---|
| *G06T 19/00* | (2011.01) |
| *G06T 7/73* | (2017.01) |
| *G06T 7/90* | (2017.01) |
| *G06T 19/20* | (2011.01) |
| *G06F 3/16* | (2006.01) |

(52) U.S. Cl.
CPC .............. *G06T 19/006* (2013.01); *G06T 7/73* (2017.01); *G06T 7/90* (2017.01); *G06T 19/20* (2013.01); *G06F 3/167* (2013.01); *G06T 2207/10024* (2013.01); *G06T 2219/2004* (2013.01)

(58) Field of Classification Search
CPC ........... G06T 7/73; G06T 7/90; G06T 19/006; G06T 19/20
See application file for complete search history.

(56) References Cited

U.S. PATENT DOCUMENTS

| | | | |
|---|---|---|---|
| 9,432,758 B1* | 8/2016 | Kirk ....................... H04R 1/028 |
| 2012/0201472 A1* | 8/2012 | Blanchflower ........ G06V 20/20 |
| | | | 382/224 |
| 2021/0364281 A1* | 11/2021 | Petill ..................... H04R 3/005 |

FOREIGN PATENT DOCUMENTS

CN          105073073 B  * 12/2018  ............. G02C 11/06

OTHER PUBLICATIONS

English Translation of CN 105073073 B, Dec. 2018 (Year: 2018).*

* cited by examiner

*Primary Examiner* — Charles Tseng
(74) *Attorney, Agent, or Firm* — Plager Schack LLP; Mark H. Plager; Stephen Hallberg (57) ABSTRACT

An augmented reality digital object image placement and anchoring system and process are disclosed. The augmented reality digital object image placement and anchoring system is configured to triangulate synchronized audio output from a user device to the input of a separate electronic coaster device, output an image as input back into the user device, process the image output's visual spectrum and audio spectrum of the audio output to authenticate as an audio/visual pairing, and triangulates placement for anchoring and construction of a defined planar surface that is aligned to a field of view perspective via a three-part frequency-specific LED visual anchor output.

15 Claims, 6 Drawing Sheets

AUGMENTED REALITY DIGITAL OBJECT IMAGE PLACEMENT AND ANCHORING SYSTEM AND PROCESS

CLAIM OF BENEFIT TO PRIOR APPLICATION

This application claims benefit to U.S. Provisional Patent Application 63/400,187, entitled "Augmented Reality System Combining multiple processes and hardware," filed Aug. 23, 2022. The U.S. Provisional Patent Application 63/400,187 is incorporated herein by reference.

CROSS-REFERENCE TO RELATED APPLICATIONS

This application is related to granted U.S. Pat. No. 9,432,758, issued on Aug. 30, 2016. The U.S. Pat. No. 9,432,758 and its entire specification is incorporated herein by reference.

BACKGROUND

Embodiments of the invention described in this specification relate generally to augmented reality visual imaging, and more particularly, to an augmented reality digital object image placement and anchoring system and process for placing and anchoring a digital object image within a field of view within an augmented reality environment.

Existing augmented reality systems, applications, and methods/processes (referred to collectively as the "existing systems") are limited in their ability to place and anchor digital object images in the augmented reality environment. The existing systems require complex setup and operation hardware and software systems to place and anchor digital object images in the augmented reality environment and, more specifically, within a field of view of a user engaged in and/or interacting with the augmented reality environment. Furthermore, the existing systems are limited in that they require specific environmental conditions (also referred to as "condition-controlled environments") for correct operation in placing and anchoring object images in the environment. Specific condition-controlled environments, such as inside a room with large surfaces, walls, etc., or against a minimal flat surface area that is clear of physical real-world items and other clutter, limit the free operation of the augmented reality environment. Consequently, the existing systems are severely constrained in the freedom to operate the augmented reality environment as they require specific environmental conditions for correct operation.

Therefore, what is needed is a way to place and anchor digital object images within a field of view within an augmented reality environment wherever the augmented reality environment is in operation with complete disregard of any real-world, tangible environmental conditions that may be present.

BRIEF DESCRIPTION

A novel augmented reality digital object image placement and anchoring system and an associated augment reality digital object image placement and anchoring process are disclosed. In some embodiments, the augmented reality digital object image placement and anchoring system comprises an electronic coaster device and a mobile device. In some embodiments, the electronic coaster device is configured to receive and process an audio signal via a triple bandpass filter and visually output light at different wavelengths based on three frequencies of the audio signal. In some embodiments, the mobile device comprises an onboard camera, an audio speaker, and an application that is configured to place, anchor, and visually output a digital object in a field of view of a user engaged in an augmented reality environment by outputting an audio signal, establishing a visual handshake between the mobile device and the electronic coaster device based on the light visually output by the electronic coaster device in agreement with the audio signal output by the mobile device, and visually outputting the digital object as placed and anchored in the augmented reality environment according the field of view of the user. In some embodiments, the augmented reality digital object image placement and anchoring system further comprises an application server that hosts a mobile platform.

In some embodiments, the augment reality digital object image placement and anchoring process includes a plurality of steps for placing and anchoring a digital object within a field of view of a user operating a mobile device with a mobile application running on the device. In some embodiments, the plurality of steps of the augment reality digital object image placement and anchoring process comprise (i) triangulating synchronized audio output from a user device to the input of a separate electronic coaster device, (ii) visually outputting an image as input back into the user device, (iii) processing the visual spectrum and audio spectrum to authenticate as an audio/visual pairing, and (iv) triangulating placement for anchoring and construction of a defined planar surface that is aligned to a field of view perspective as a three part visual output, by the electronic coaster, of an augmented reality digital object image within the user's field of view. In some embodiments, the three part visual output of the electronic coaster corresponds to specific audio frequency ranges and when processed by an application with an audio and visual spectrum analyzer can be authenticated as a defined anchor location for the digital object image to be placed and framed into perspective with complete disregard to environmental conditions.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

Embodiments of the invention described in this specification include an augmented reality digital object image placement and anchoring system and an associated augment reality digital object image placement and anchoring process.

In some embodiments, the augmented reality digital object image placement and anchoring system comprises an electronic coaster device and a mobile device. In some embodiments, the augmented reality digital object image placement and anchoring system further comprises an application server that hosts a mobile platform.

In some embodiments, the electronic coaster device comprises a printed circuit board (PCB), a processing unit, an audio input device that is configured to receive an audio signal, a triple bandpass filter that is configured to process at least three frequencies of the audio signal, and a plurality of light sources that are configured to visually output light at different wavelengths based on the three frequencies of the audio signal. In some embodiments, the plurality of light sources comprises a plurality of light emitting diodes (LEDs).

In some embodiments, the mobile device comprises a processor, an application that runs on the processor and is configured to present an augmented reality environment, an onboard digital image sensor device that is configured to capture the light visually output by the plurality of light sources, an audio output device that is configured to output audio, and an audio and visual spectrum analyzer that is embedded in the application and configured to process the captured light to establish an anchor location for placing digital content in a field of view within the augment reality environment. In some embodiments, the application, when running on the processor of the mobile device, connects to the mobile platform hosted by the application server to retrieve digital content for display in the field of view within the augmented reality environment. In some embodiments, the digital content is placed and anchored in the field of view within the augmented reality environment after a visual handshake between the mobile device and the electronic coaster device based on the onboard digital image sensor device capturing the light visually output by the plurality of light sources.

In some embodiments, the audio input device comprises a microphone, In some embodiments, the audio input device comprises a wireless device configured to receive wirelessly transmitted audio data streams. In some embodiments, the onboard digital image sensor device comprises an onboard camera. In some embodiments, the onboard camera comprises at least one of a CCD camera and a CMOS camera. In some embodiments, the audio output device comprises an audio speaker. In some embodiments, the audio output device comprises wireless device configured to stream audio data as audio output. In some embodiments, the application comprises a mobile app.

In some embodiments, the augment reality digital object image placement and anchoring process includes a plurality of steps for placing and anchoring a digital object within a field of view of a user operating a mobile device with a mobile application running on the device. In some embodiments, the plurality of steps of the augment reality digital object image placement and anchoring process comprise (i) triangulating synchronized audio output from a user device to the input of a separate electronic coaster device, (ii) visually outputting an image as input back into the user device, (iii) processing the visual spectrum and audio spectrum to authenticate as an audio/visual pairing, and (iv) triangulating placement for anchoring and construction of a defined planar surface that is aligned to a field of view perspective as a three part visual output, by the electronic coaster, of an augmented reality digital object image within the user's field of view. In some embodiments, the three part visual output of the electronic coaster corresponds to specific audio frequency ranges and when processed by an application with an audio and visual spectrum analyzer can be authenticated as a defined anchor location for the digital object image to be placed and framed into perspective with complete disregard to environmental conditions.

As stated above, existing systems are limited in their ability to place and anchor digital object images in the augmented reality environment. The existing systems require complex setup and operation hardware and software systems to place and anchor digital object images in the augmented reality environment and, more specifically, within a field of view of a user engaged in and/or interacting with the augmented reality environment. Furthermore, the existing systems are limited in that they require condition-controlled environments for correct operation in placing and anchoring object images in the environment. For example, specific condition-controlled environments, such as inside a room or against a minimal flat surface area that is clear of other tangible real-world items beyond the flat surface, limit the free operation of the augmented reality environment. Consequently, the existing systems are severely constrained in the freedom to operate the augmented reality environment as they require specific environmental conditions for correct operation. Embodiments of the augmented reality digital object image placement and anchoring system and associated process described in this specification solve such problems by processing and triangulating audio and visual spectrums for recognition for anchoring and framing into perspective an augmented reality digital object within a user's field of view.

Embodiments of the augmented reality digital object image placement and anchoring system and associated process described in this specification differ from and improve upon the existing systems. In particular, one of the existing systems is limited to an enclosed space and requires using light detection and ranging (LiDAR) mapping when surfaces change or are cluttered. The LiDAR mapping typically introduces voids of functionality, especially in real-world outside environments as the light emitted (or laser) during LiDAR scanning often cannot be detected in return, since vast and/or long open spaces may be present within the field of view being considered. The result when the light is not returned is no detection by the LiDAR system which means there are voids and unknowns in the field. Thus, the use of LiDAR for object placement and anchoring in augmented reality environments generally requires a smaller area, preferably enclosed with flat surfaces, and free of clutter. By contrast, augmented reality digital object image placement and anchoring system described in this disclosure includes an application with an audio and visual spectrum analyzer and an electronic coaster which provides a three-part visual output that corresponds to specific audio frequency ranges (also referred to as the "three-part frequency-specific LED visual anchor output"). When the audio and visual spectrum analyzer of the application processes the three-part frequency-specific LED visual anchor output corresponding to the specific audio frequency ranges it is possible to authenticate it as a defined anchor location for the digital object image to be placed and framed into perspective with complete disregard to complex surfaces, vast and/or long open ranges that are effectively surfaceless, and other environmental conditions in the real-world area at which the augmented reality environment is operating.

The augmented reality digital object image placement and anchoring system of the present disclosure may be comprised of the following elements. This list of possible constituent elements is intended to be exemplary only and it is not intended that this list be used to limit the augmented reality digital object image placement and anchoring system of the present application to just these elements. Persons having ordinary skill in the art relevant to the present disclosure may understand there to be equivalent elements that may be substituted within the present disclosure without changing the essential function or operation of the augmented reality digital object image placement and anchoring system.

1. An electronic coaster device (for example, the electronic coaster described in U.S. Pat. No. 9,432,758)
2. Mobile device (e.g., a smartphone) with a camera (on-board camera or external camera connected to the mobile device) and an audio output (such as a speaker, but can be bluetooth streaming of the audio input to the coaster from the mobile device)
3. An application server (e.g., cloud application service—but optional since mobile app can run standalone in some configurations)
4. A mobile application (that optionally connects to the application server while running on a processor of the mobile device, but in some embodiments can operate as a standalone app that directly connects to the electronic coaster)
5. Audio input source (e.g., audio output by the mobile device)

The augmented reality digital object image placement and anchoring system of the present disclosure generally works in the following manner. The mobile device emits audio from the audio speaker. The audio is the audio input for the electronic coaster. The electronic coaster processes the audio input from the mobile device into a three-part frequency-specific LED visual anchor output to be returned to the mobile device. The camera of the mobile device captures the three-part frequency-specific LED visual anchor output and the audio and visual spectrum analyzer of the application (while running on the processing unit of the mobile device), in combination with the application server, processes the captured three-part frequency-specific LED visual anchor output to triangulate the location at which the application will place the digital object within the field of view of the user. Then the application places the digital object within the field of view of the user in the augmented reality environment.

The electronic coaster processes the audio input from the mobile device into a three-part frequency-specific LED visual anchor output, which is returned to the mobile device to be processed by the camera of the mobile device and a combination of audio and video spectrum analyzing (by the application and the application server) to triangulate the location the application will place the digital object within the field of view of the user. If all components are operating in this way, then the digital object can be placed within the field of view of the user.

The augmented reality digital object image placement and anchoring system of the present disclosure is made by combining the electronic coaster, an audio input source, a mobile device (e.g., a smartphone) operated by a user, and an application configured to perform audio and visual spectrum analysis to authenticate location of a digital object image within the field of view of the mobile device. The audio input source can also be an audio input method adapted for the current state of the art in audio technology as it develops.

To use the augmented reality digital object image placement and anchoring system of the present disclosure, one would deploy the system for active operation. To deploy the augmented reality digital object image placement and anchoring system, one would connect the electronic coaster to the mobile device (e.g., smartphone). The connection may be a wireless connection. The application would also be loaded to run on the mobile device. During operation of the application, the user of the mobile device may interact with the application to construct an augmented reality environment for interaction of digital object images in almost any environment with the digital object image being visually output for nearly any purpose (e.g., entertainment, educational, or any other purpose). While much of this specification focuses on the placement and anchoring a (single) digital object image in the augmented reality environment, it is noted here that multiple digital object images can be supported for placement and anchoring in the manner described above.

Figure 1:
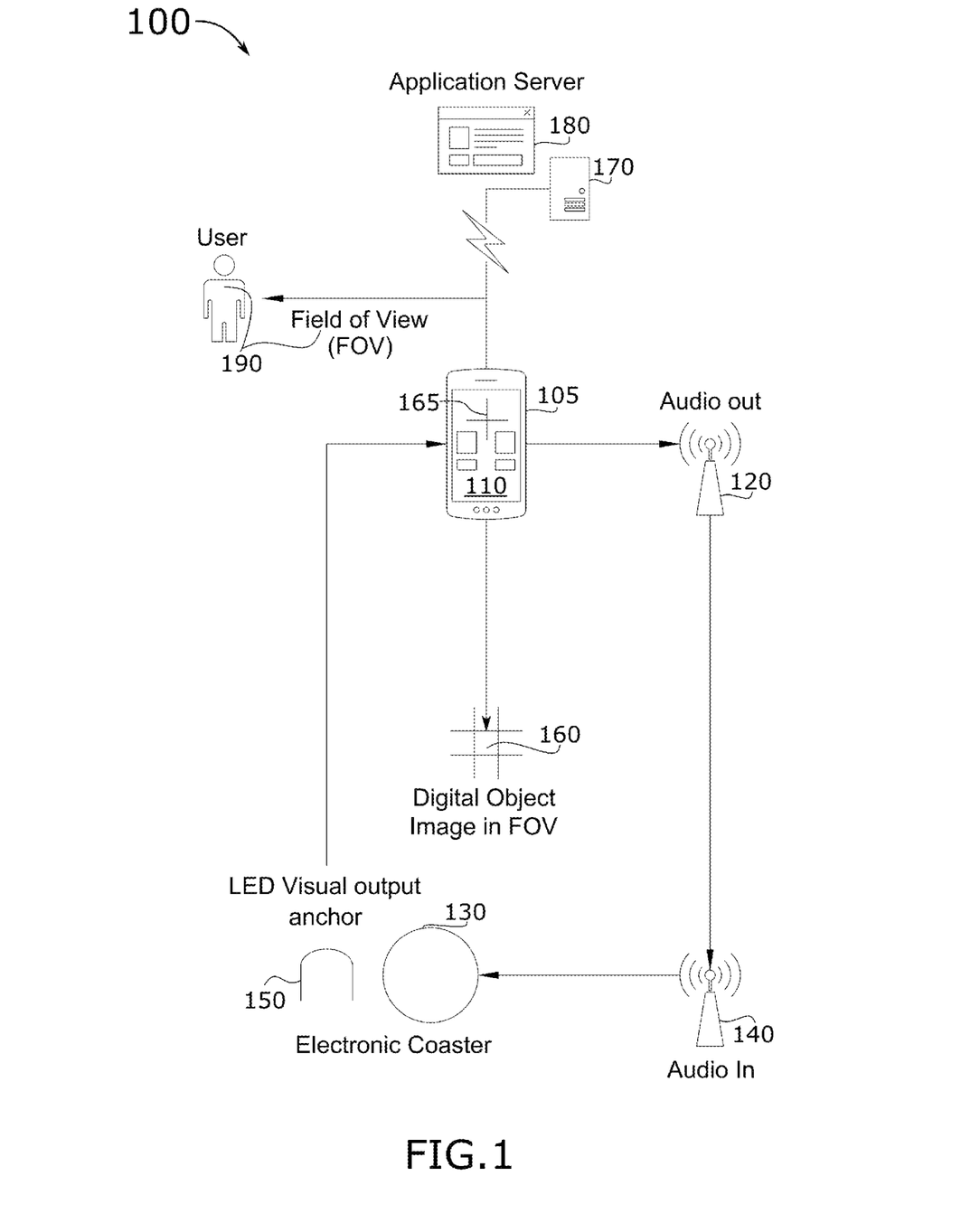
FIG. 1 conceptually illustrates a schematic view of an augmented reality digital object image placement and anchoring system in some embodiments.

By way of example, FIG. 1 conceptually illustrates a schematic view of an augmented reality digital object image placement and anchoring system 100. As shown in this figure, the augmented reality digital object image placement and anchoring system 100 comprises a mobile device 105, an application 110 that runs on the mobile device 105, an audio output device 120 that outputs an audio signal, an electronic coaster device 130, an audio input device 140 that captures that audio signal as incoming audio, anchoring LED visual output 150 which includes several LEDs, an anchor and placement location 160 nearby the electronic coaster that conceptually enables the application 110 to place the digital object at a frame point 165 of a field of view of a user 190 operating the mobile device 105 and engaging in the augmented reality environment. Also shown are the application server 170 and an application server interface 180 (such as a cloud application service that runs on the application server 170 and to which the mobile device may connect over a network when the application 110 seeks to retrieve digital content. In terms of how the augmented reality digital object image placement and anchoring system 100 operates, reference is now made to FIG. 2.

Figure 2:
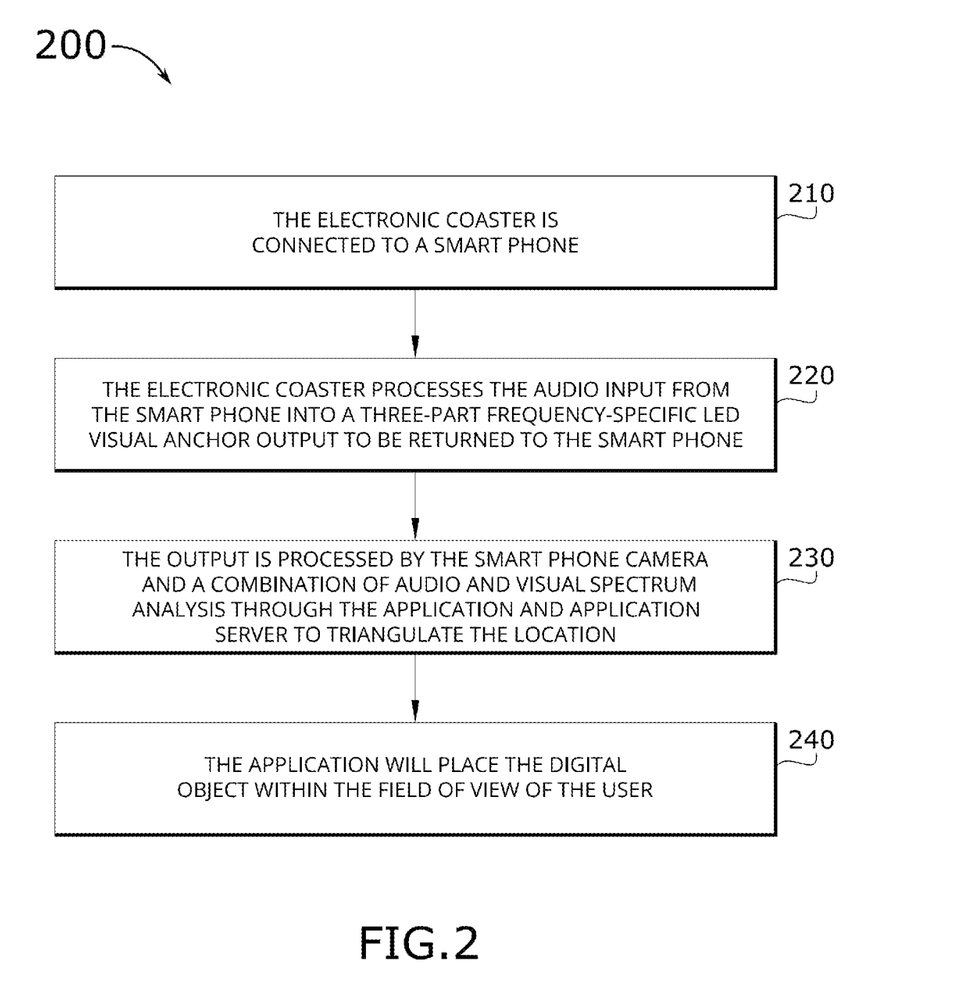
FIG. 2 conceptually illustrates a high-level augmented reality digital object image placement and anchoring process in some embodiments.

Specifically, FIG. 2 conceptually illustrates a high-level augmented reality digital object image placement and anchoring process 200. As shown in this figure, the high-level augmented reality digital object image placement and anchoring process 200 starts by connecting the electronic coaster device to the mobile device (e.g., smart phone) operated by the user who is engaged in the augmented reality environment (at 210). For instance, the user may be playing an augmented reality game and encounters the electronic coaster to which the user connects his or her mobile device, which may be a smartphone. The connection can occur before the user starts engaging in the augmented reality environment and be configured by the application, or can be configured in realtime as the user comes upon the electronic coaster (e.g., by pairing through a Bluetooth connection between the mobile device and the electronic coaster, by connecting via WiFi in which both the mobile device and the electronic coaster are registered devices within the augmented reality environment, or via a different wireless connection method).

After the electronic coaster device and the user's smartphone are connected, the high-level augmented reality digital object image placement and anchoring process 200 proceeds to the next step at which the electronic coaster processes an audio signal that is output by the smartphone of the user (at 220). Specifically, the electronic coaster has an onboard triple bandpass filter device that is configured to process the incoming audio signal into three separate frequencies and visually output a corresponding three-part frequency-specific LED visual anchor light pattern provided by the plurality of LEDs of the electronic coaster device. Since the smartphone of the user is equipped with an onboard camera, the light visually output by the LEDs of the electronic coaster is captured by the camera (provided the camera is aligned to face the light and not obstructed).

In some embodiments, the high-level augmented reality digital object image placement and anchoring process 200 proceeds to the next step at which the light visually output by the LEDs and received at the smartphone is processed by the smartphone camera while the audio and visual spectrum analyzer embedded within the application performs audio and visual spectrum analysis of a combination of the audio spectrum and the visual spectrum (at 230) to triangulate the location for placement and anchoring of the digital content in the field of view of the user and within the augmented reality environment. After this is complete, the high-level augmented reality digital object image placement and anchoring process 200 moves on to the final step at which the application places the digital content object within the field of view of the user in the augmented reality environment.

As the application continues to operate after placement of the digital object in the augmented reality environment, the user may move around or change the field of view by reorienting the smartphone. In that case, the application running on the smartphone makes corresponding changes to the view of the digital object in the augmented reality environment. The corresponding changes include such things as reoriented angles of view (e.g., the field of view changes from a first planar level to a higher or lower planar level and corresponding change in angle view), zoom-in and zoom-out views based on physical movement of the user closer to and/or further away from the anchor point location corresponding to the digital object placement in the augmented reality environment, 360 degree re-orientation as the user walks around the anchor point, etc.

Thus, the high-level augmented reality digital object image placement and anchoring process 200 demonstrates a high degree of versatility in not only placing and anchoring the digital object in the field of view in the augmented reality environment, but also maintaining and updating the view of the digital object according to realtime movement of the user, thereby providing a real-life experience for the user to view the digital object from whatever field of view he or she may move to or change, etc. A more detailed example is described next, by reference to FIG. 3.

Figure 3:
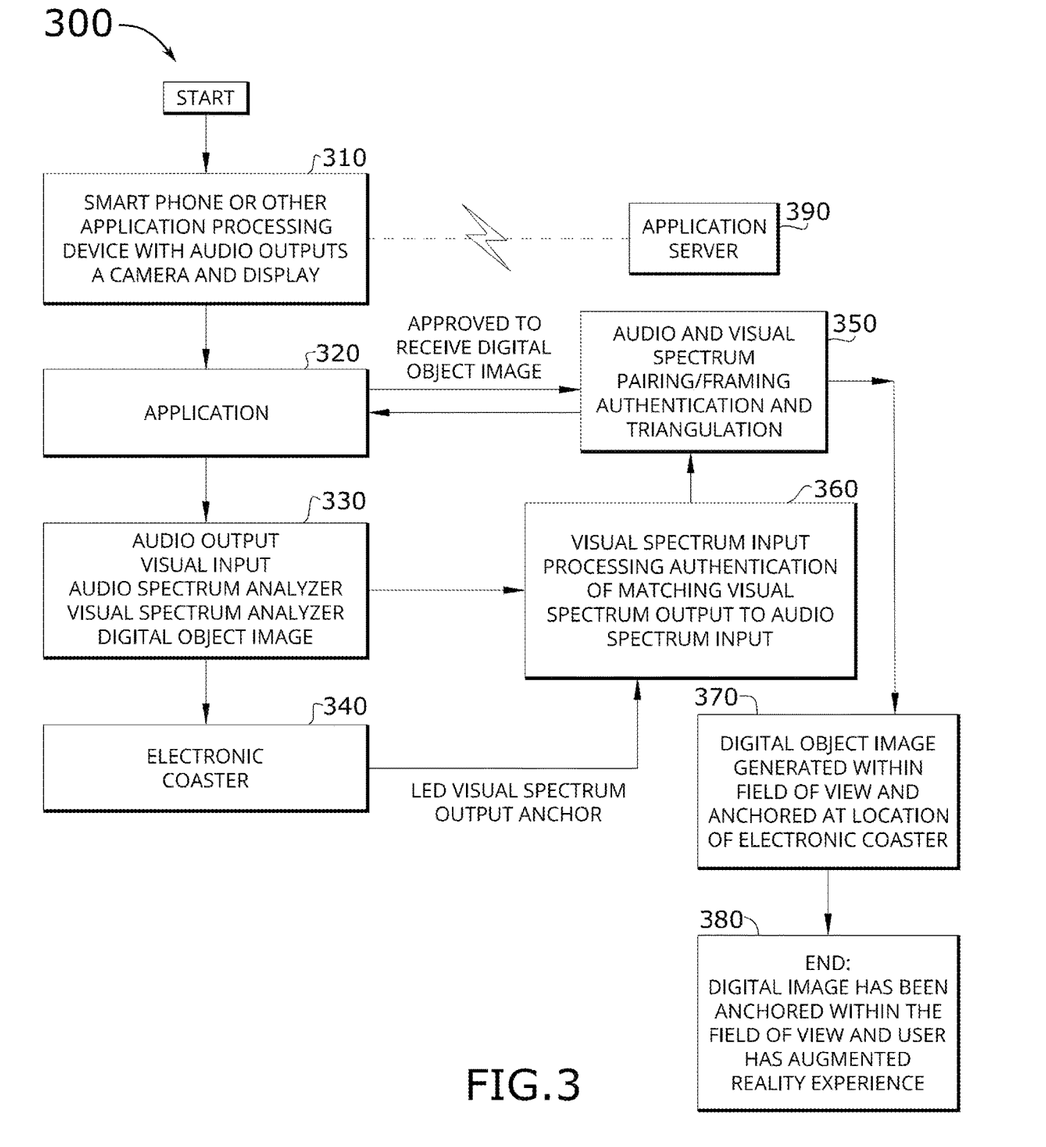
FIG. 3 conceptually illustrates a detailed augmented reality digital object image placement and anchoring process for placing and anchoring a digital object within a field of view in some embodiments.

Specifically, FIG. 3 conceptually illustrates a detailed augmented reality digital object image placement and anchoring process for placing and anchoring a digital object within a field of view 300. As shown in this figure, the detailed augmented reality digital object image placement and anchoring process for placing and anchoring a digital object within a field of view 300 starts by action of a mobile device, smartphone, or other application processing device ("user device") with audio output capabilities and a camera (either onboard or external), and a display screen for the augmented reality environment (at 310). In particular, a user of the user device is engaged in the augmented reality environment with the application running on the user device (at 320). The application first pairs or connects to one or more electronic coaster devices utilized for fulfillment of digital object placement and anchoring with respect to the augmented reality environment provided through the application and, therefore, goes through a pairing/connection process (at 350).

After this connection is established from the user device to the electronic coaster, the application may output audio (at 330) or the application may have already been outputting the audio before connecting to the electronic coaster. Whatever the sequence (and both are supported), the audio output by the user device includes at least three identifiable and separate frequencies which a triple bandpass filter can process. In this case, the triple bandpass filter is an onboard device connected to the printed circuit board and processing unit of the electronic coaster device. In this way, it is possible to capture the audio output by the user device as incoming audio and to isolate the three separate frequencies of the audio signal. Then the electronic coaster (at 340) can output light from the many onboard LEDs according to the three part audio frequencies (at 330). In particular, the light output by the LEDs includes LED visual spectrum across at least three different wavelengths corresponding to the different colors of the LEDs. For instance, the triple bandpass filter of the electronic coaster (at 340) may identify three separate audio frequencies-low, mid, and high.

Then, the visual spectrum anchor output may visually output blue LED light for the low frequency audio, green LED light for the mid-range frequency, and red LED light for the high range frequency. In this way, the visual output of the LEDs from the electronic coaster is captured by the camera of the user device and treated as visual spectrum input for processing by the audio and visual spectrum analyzer embedded within the application running on the user device (at 360). In some embodiments, this acts as an authentication step for establishing a handshake agreement between the user device (which is outputting the audio) and the electronic coaster (which is visually outputting the light spectrum), provided the visual spectrum matches with the audio spectrum. Also, this authentication by handshake has the effect of allowing for digital object placement and anchoring even when there are other audible sounds in the real-world environment in which the user is operating the user device. So, the area can be noisy, or have other sounds, voices, music, etc., while the visual spectrum can also be separated from other extraneous visual items, such as by complex visual environments, outdoors with big gaps or sunlight/external other lights, etc. After processing for authentication (at 360), the audio and visual spectrum are locked into a pairing which allows for triangulation of the position for framing of the digital object within the field of view of the user (as seen by the user on the display screen of the user device) within the augmented reality environment (at 350). After the position is triangulated, the digital object is generated in the field of view and anchored to the location vis-a-vis the electronic coaster (at 370). Finally, the digital object (image) is anchored in the augmented reality environment and configured to display in the field of view of the user who is engaged in the augmented reality environment (at 380). As noted above, any and all movements, re-orientations, or changes in perspective by the user (via the user device) are detected in realtime and the respective digital object view is updated accordingly.

Figure 4:
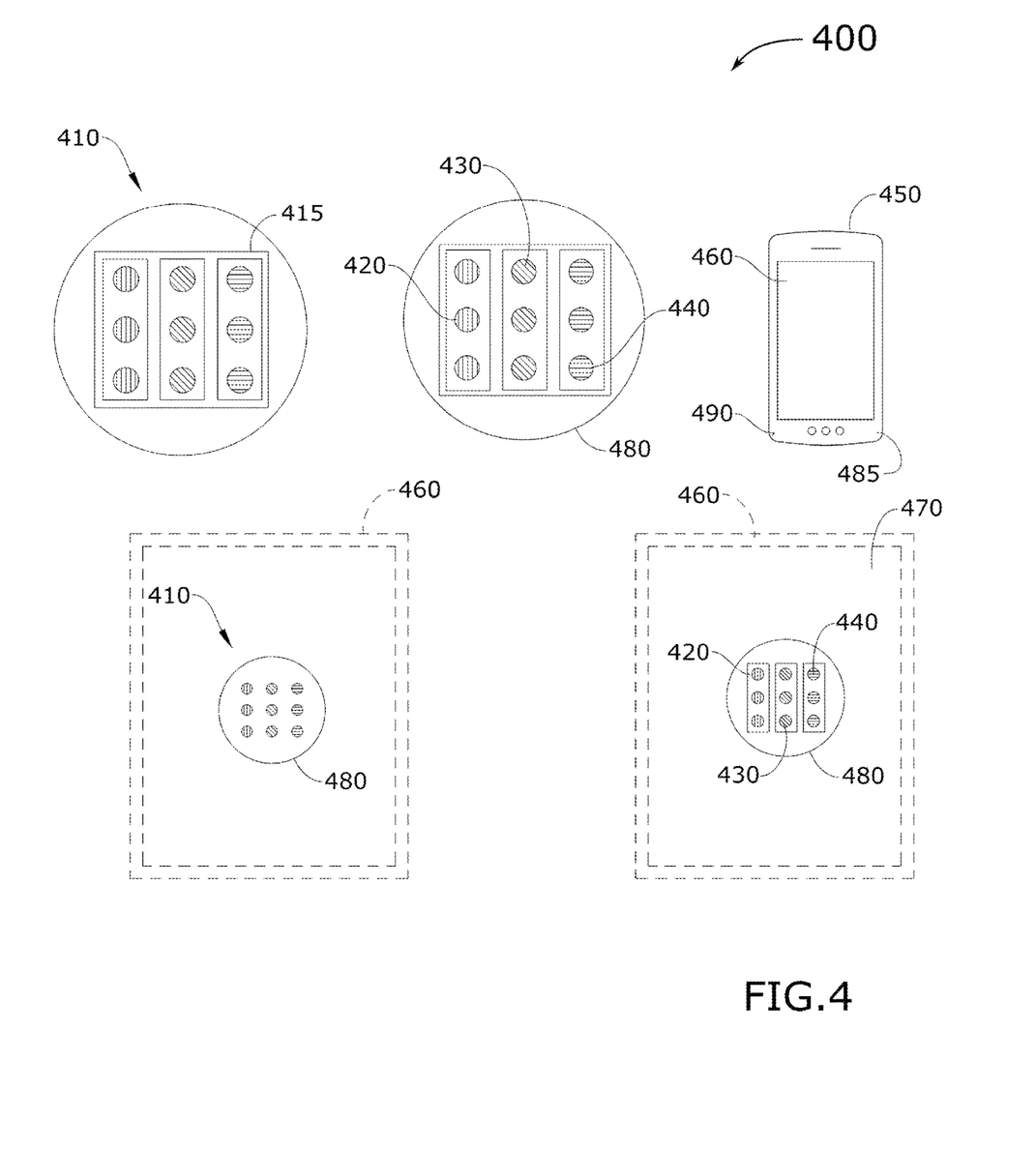
FIG. 4 conceptually illustrates LED output of a three-way bandpass filter of an electronic coaster device of the augmented reality digital object image placement and anchoring system in some embodiments.

By way of another example, FIG. 4 conceptually illustrates LED output of a three-way bandpass filter of an electronic coaster device of the augmented reality digital object image placement and anchoring system 400. As shown in this figure, the augmented reality digital object image placement and anchoring system 400 involves use of an electronic coaster device 410 with a triple bandpass filter 415. The triple bandpass filter 415 is shown in this figure as a box, but in practice, it is embedded in the electronic coaster device 410 and connected as an onboard component of the main printed circuit board that controls operation of the electronic coaster 410. However, there are several individual LEDs that are exposed along an exterior surface of the electronic coaster 410. These individual LEDs are organized according to wavelength/color which corresponds to the function of the triple bandpass filter 415. In particular, there is first collection of LEDs that provide a first bandpass filter LED output 420, a second collection of LEDs that provide a second bandpass filter LED output 430, and a third collection of LEDs that provide a third bandpass filter LED output 440.

Also shown in this figure is a smartphone 450, a display screen 460, an application 470, an audio input device 480 (e.g., microphone, such as a microphone slot or port along the side surface of the electronic coaster device 410) of the electronic coaster device 410, and an audio output device 485 embedded within the smartphone 450. The display screen 460 presents the augmented reality environment to the user in the field of view provided through the camera (not shown in the figure) of the smartphone 450. While the application 470 is running on the smartphone 450 and presenting the augmented reality environment on the display screen 460, the application 470 also outputs audio through the audio output device 485. The smartphone 450 may also be connected wirelessly to the application server 490 through which the application 470 can connect to the cloud application service hosted by the application server 490.

Although the electronic coaster device 410 shown in this figure includes a triple bandpass filter 415, the electronic coaster 410 is not limited to a three-way bandpass filter, but may include other multiples of onboard bandpass filters with associated LED configurations that provide the LED visual output. For instance, other electronic coaster devices supported by the augmented reality digital object image placement and anchoring system 400 can have four, five, or more onboard bandpass filters in similar or different LED configurations as the triple bandpass filter 415 shown in this figure. For instance, the LED configurations in this figure demonstrate three LEDs for each bandpass filter of the triple bandpass filter 415, namely, the first bandpass filter LED output 420, the second bandpass filter LED output 430, and the third bandpass filter LED output 440. The individual LEDs are shown with different hatching marks indicative of different wavelengths of light (which human observers perceive as visible color) they respectively emit. As an example, the color of the LEDs of the first bandpass filter LED output 420 may be red, the color of the LEDs of the second bandpass filter LED output 430 may be green, and the color of the LEDs of the third bandpass filter LED output 440 may be blue. Furthermore, the color combinations can be further differentiated by the number of LEDs that are illuminated for any given bandpass filter of the triple bandpass filter 415. For example, illuminating all three red LEDs may be a way to authenticate a particular high audible frequency of the audio being output by the smartphone 450.

When the application 470 outputs the audio signal through the audio output device 485 of the smartphone 450, the audio input device 480 of the electronic coaster device 410 captures the incoming audio, which is processed by the triple bandpass filter 415 to authenticate as corresponding visual output via the first bandpass filter LED output 420, the second bandpass filter LED output 430, and the third bandpass filter LED output 440. Then the user can orient the display screen 460 of the smartphone 450 to face the visual output. This visual output is captured by the camera of the smartphone 450, which triggers the application 470 to compare the audio signal and the visual output via the audio and visual spectrum analyzer embedded in the application 470.

In this way, the display screen 460 of the smartphone 450 presents the field of view to the user within the augmented reality environment provided through the camera (not shown in the figure) of the smartphone 450. Notably, the smartphone 450 may also be connected wirelessly to the application server 490 through which the application 470 by connecting to the cloud application service hosted by the application server 490.

Figure 5:
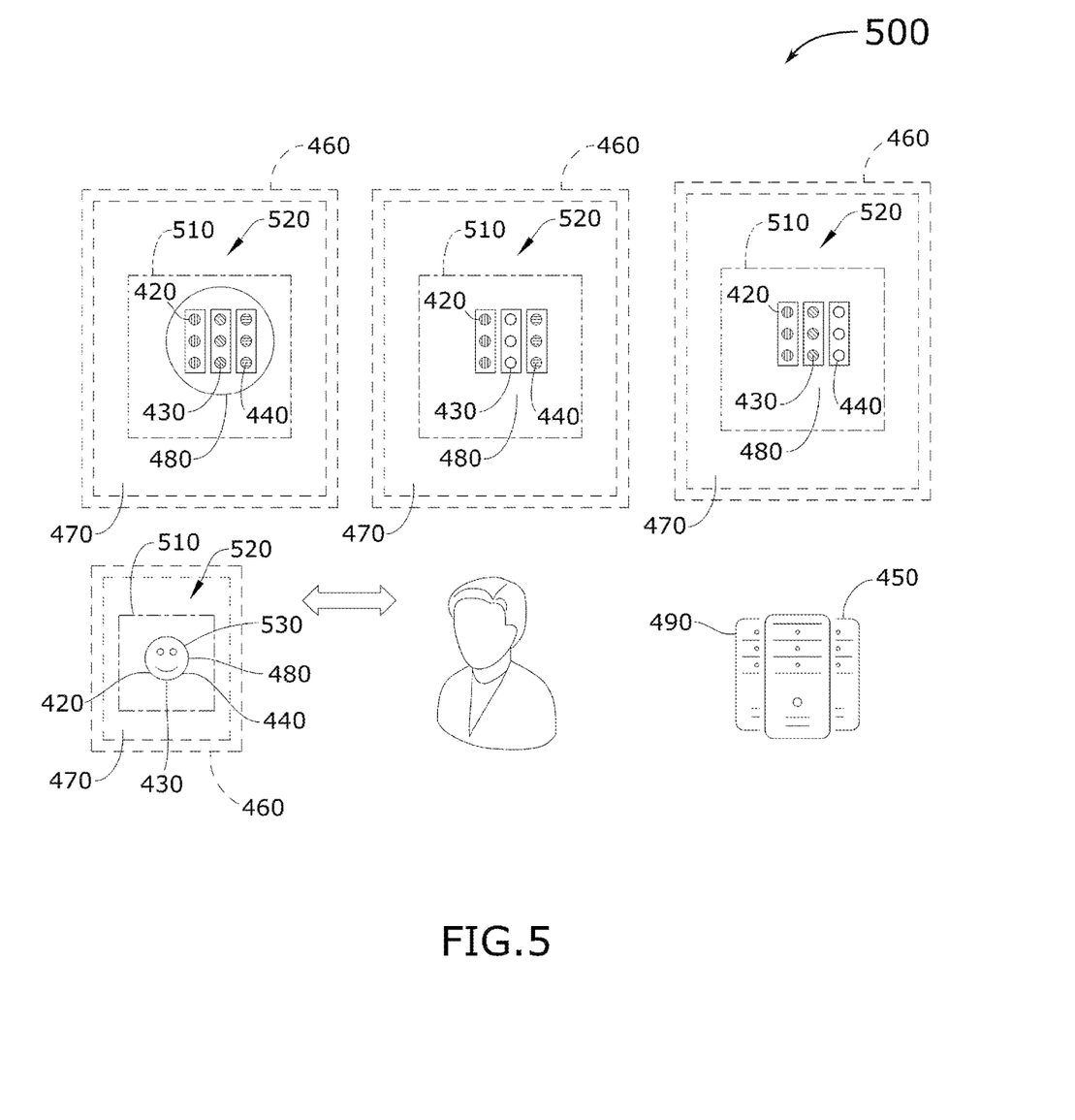
FIG. 5 conceptually illustrates different visual output of LEDs of an electronic coaster device of the augmented reality digital object image placement and anchoring system in some embodiments.

Now turning to another example, FIG. 5 conceptually illustrates an augmented reality digital object image placement and anchoring system 500 with different visual output configurations of the LEDs as viewed through the display screen 460 in an application 510 on the smartphone 450. Specifically, the application 510 is creating an object frame and processing audio and visual spectrums through analysis and comparison to verify location and triangulate visual object placement and perspective by cross comparing visual spectrum output to audio spectrum input/output. Also shown in this figure is the augmented reality background 520 presented in the field of view on the display screen 460. The augmented reality background includes both real background images as captured by the camera of the smartphone 450 (or other optical input processor). Also, a digital image overlay of an augmented reality digital object 530 is visually output within the augmented reality environment. This is made possible by the comparison and authentication handshaking process in which the audio output by the smartphone 450 is received at the microphone of the electronic coaster, processed and visually LED output is illuminated along the associated bands. In some cases, bands of LED output can be turned off, such that only two wavelengths (colors) are output—and as long as the application 510 running on the smartphone 450 matches the illuminated pattern to the audio, then the augmented reality digital object 530 is displayed in the augmented reality environment. Note also that the augmented reality digital object 530 may be downloaded from the application server 490 over the network, when authentication and handshake are successful.

While the example described above pertain to smartphone use, the smart phone could essentially be substituted for any computing device with an audio output and a visual input. Also, the digital object image can be output for display on the screen in any form of content from education pictures or models to animated cartoon features or text or live representations or avatars.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the terms "application" and "software" are meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 6:
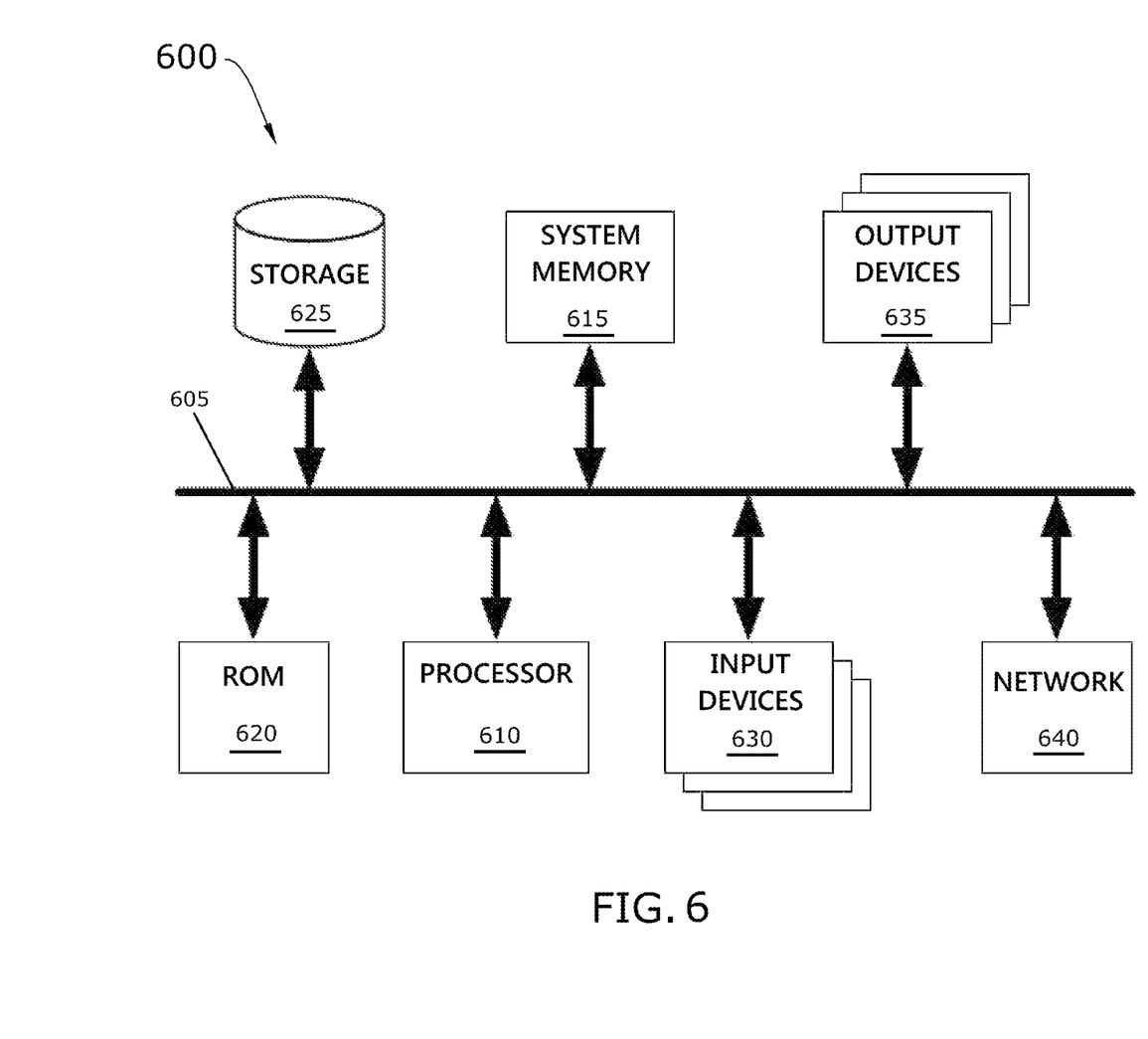
FIG. 6 conceptually illustrates an electronic system with which some embodiments of the invention are implemented.

FIG. 6 conceptually illustrates an electronic system 600 with which some embodiments of the invention are implemented. The electronic system 600 may be a computer (e.g., a desktop computer, a personal computer (or "PC"), a laptop computer, etc.), a mobile device (e.g., a smartphone, a personal digital assistant (or "PDA") device, a tablet computing device, etc.), or any other sort of electronic device. Such an electronic system includes various types of computer readable media and interfaces for various other types of computer readable media. Electronic system 600 includes a bus 605, processing unit(s) 610, a system memory 615, a read-only memory 620, a permanent storage device 625, input devices 630, output devices 635, and a network 640.

The bus 605 collectively represents all system, peripheral, and chipset buses that communicatively connect the numerous internal devices of the electronic system 600. For instance, the bus 605 communicatively connects the processing unit(s) 610 with the read-only memory 620, the system memory 615, and the permanent storage device 625.

From these various memory units, the processing unit(s) 610 retrieves instructions to execute and data to process in order to execute the processes of the invention. The processing unit(s) may be a single processor or a multi-core processor in different embodiments.

The read-only-memory (ROM) 620 stores static data and instructions that are needed by the processing unit(s) 610 and other modules of the electronic system. The permanent storage device 625, on the other hand, is a read-and-write memory device. This device is a non-volatile memory unit that stores instructions and data even when the electronic system 600 is off. Some embodiments of the invention use a mass-storage device (such as a magnetic or optical disk and its corresponding disk drive) as the permanent storage device 625.

Other embodiments use a removable storage device (such as a floppy disk or a flash drive) as the permanent storage device 625. Like the permanent storage device 625, the system memory 615 is a read-and-write memory device. However, unlike storage device 625, the system memory 615 is a volatile read-and-write memory, such as a random access memory. The system memory 615 stores some of the instructions and data that the processor needs at runtime. In some embodiments, the invention's processes are stored in the system memory 615, the permanent storage device 625, and/or the read-only memory 620. For example, the various memory units include instructions for processing appearance alterations of the LED light patterns in accordance with some embodiments. From these various memory units, the processing unit(s) 610 retrieves instructions to execute and data to process in order to execute the processes of some embodiments.

The bus 605 also connects to the input and output devices 630 and 635. The input devices enable the user to communicate information and select commands to the electronic system. The input devices 630 include alphanumeric keyboards and pointing or cursor control devices. The output devices 535 include printers and display devices, such as liquid crystal displays (LCD) and organic light emitting diode (OLED) displays. Some embodiments include devices such as a touchscreen that functions as both input and output devices.

Finally, as shown in FIG. 6, bus 605 also couples electronic system 600 to a network 640 through a network adapter (not shown). In this manner, the computer can be a part of a network of computers (such as a local area network ("LAN"), a wide area network ("WAN"), or an Intranet), or a network of networks (such as the Internet). Any or all components of electronic system 600 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes and logic flows may be performed by one or more programmable processors and by sets of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 2 and 3 conceptually illustrate processes. The specific operations of each process may not be performed in the exact order shown and described. Specific operations may not be performed in one continuous series of operations, and different specific operations may be performed in different embodiments. Furthermore, each process could be implemented using several sub-processes, or as part of a larger macro process. Thus, one of ordinary skill in the art would understand that the invention is not to be limited by the foregoing illustrative details, but rather is to be defined by the appended claims.

I claim:

1. An augmented reality digital object image placement and anchoring system comprising:
   a mobile device operable by a user engaged in an augmented reality environment, wherein the mobile device comprises a processor, a camera, and an audio output device configured to output an audio signal;
   an electronic coaster device with an audio input device configured to receive the audio signal output by the audio output device of the mobile device, a triple bandpass filter configured to process the audio signal into three separate frequencies, and a visual output source configured to visually output light at different wavelengths based on the three separate frequencies of the audio signal;
   an application that runs on the processor of the mobile device and is configured to place, anchor, and visually output a digital object in a field of view of the user engaged in the augmented reality environment by (i) establishing a visual handshake between the mobile device and the electronic coaster device based on the light visually output by the electronic coaster device in agreement with the audio signal output by the audio output device of the mobile device and (ii) visually outputting the digital object as placed and anchored in the augmented reality environment according to the field of view of the user.

2. The augmented reality digital object image placement and anchoring system of claim 1, further comprising an application server.

3. The augmented reality digital object image placement and anchoring system of claim 2, wherein the application server hosts a cloud application service.

4. The augmented reality digital object image placement and anchoring system of claim 3, wherein the application is configured to connect to the cloud application service when the mobile device connects over a network to the application server.

5. The augmented reality digital object image placement and anchoring system of claim 1, wherein the mobile device further comprises a display screen, wherein the application is configured to present the augmented reality environment on the display screen of the mobile device.

6. The augmented reality digital object image placement and anchoring system of claim 5, wherein the visual output source of the electronic coaster device comprises a plurality of light emitting diodes (LEDs).

7. The augmented reality digital object image placement and anchoring system of claim 6, wherein the application comprises an audio and visual spectrum analyzer.

8. The augmented reality digital object image placement and anchoring system of claim 7, wherein the audio and visual spectrum analyzer is configured to analyze a visual spectrum of the light visually output by the electronic coaster device as illuminated by the plurality of LEDs.

9. The augmented reality digital object image placement and anchoring system of claim 8, wherein the plurality of LEDs comprise a first plurality of LEDs that emit light at a first wavelength associated with a first color, a second plurality of LEDs that emit light at a second wavelength associated with a second color, and a third plurality of LEDs that emit light at a third wavelength associated with a third color.

10. A non-transitory computer readable medium storing an application which, when executed by a processor of a mobile device, places and anchors a digital object within a field of view, said application comprising sets of instructions for execution by the processor to perform operations comprising:
    triangulating synchronized audio output from a user device to audio input of a separate electronic coaster device;
    visually outputting an image as input back into a camera of the user device;
    processing a visual spectrum of the visually output image and an audio spectrum of the audio output to authenticate as an audio/visual pairing; and
    triangulating placement for anchoring and construction of a defined planar surface that is aligned to a field of view perspective as a three part visual output of an augmented reality digital object image within the field of view.

11. The non-transitory computer readable medium of claim 10, wherein the visually output image is visually output by the electronic coaster device.

12. The non-transitory computer readable medium of claim 11, wherein the electronic coaster device comprises a plurality of light emitting diodes (LEDs) that illuminate to visually output the visually output image.

13. The non-transitory computer readable medium of claim 10, wherein the field of view is a perspective of a user operating the user device.

14. The non-transitory computer readable medium of claim 10, wherein the three part visual output of the electronic coaster device corresponds to specific audio frequency ranges of the audio output.

15. The non-transitory computer readable medium of claim 10, wherein the application further comprises a set of instructions for execution by the processor to perform an operation comprising processing, by an audio and visual spectrum analyzer, the three part visual output of the electronic coaster device to determine whether the three part visual output matches the specific audio frequency ranges of the audio output.

* * * * *